(12) United States Patent
Ovshinsky et al.

(10) Patent No.: US 7,297,435 B2
(45) Date of Patent: Nov. 20, 2007

(54) SOLID OXIDE FUEL CELL (75) Inventors: Stanford R. Ovshinsky, Bloomfield Hills, MI (US); Srinvasan Venkatesan, Southfield, MI (US); Dennis A. Corrigan, Troy, MI (US)

(73) Assignee: Ovonic Fuel Cell Company, LLC, Rochester Hills, MI (US)

( * ) Notice: Subject to any disclaimer, the term of this patent is extended or adjusted under 35 U.S.C. 154(b) by 456 days.

(21) Appl. No.: 11/076,595

(22) Filed: Mar. 10, 2005

(65) Prior Publication Data

US 2006/0204829 A1    Sep. 14, 2006

(51) Int. Cl.
  *H01M 4/00*  (2006.01)
  *H01M 8/18*  (2006.01)
  *H01M 8/10*  (2006.01)

(52) U.S. Cl. .............................. 429/40; 429/19; 429/30

(58) Field of Classification Search ................... 429/40, 429/19, 30
  See application file for complete search history.

(56) References Cited

U.S. PATENT DOCUMENTS

| | | | |
|---|---|---|---|
| 4,847,172 A * | 7/1989 | Maskalick et al. ............ | 429/30 |
| 5,114,803 A * | 5/1992 | Ishihara et al. ................ | 429/30 |
| 5,470,672 A * | 11/1995 | Naoumidis .................... | 429/40 |
| 5,656,388 A | 8/1997 | Bugga et al. | |
| 5,888,665 A | 3/1999 | Bugga et al. | |
| 6,248,468 B1 * | 6/2001 | Ruka et al. .................... | 429/40 |
| 6,790,474 B1 * | 9/2004 | Hishinuma et al. .......... | 427/115 |
| 6,841,512 B1 * | 1/2005 | Fetcenko et al. ............ | 502/335 |
| 6,998,184 B2 * | 2/2006 | Venkatesan et al. ............ | 429/9 |
| 7,132,193 B2 * | 11/2006 | Fetcenko et al. ............. | 429/40 |

* cited by examiner

*Primary Examiner*—Patrick Joseph Ryan
*Assistant Examiner*—Thomas H. Parsons
(74) *Attorney, Agent, or Firm*—David W. Schumaker (57) ABSTRACT

A solid oxide fuel cell with intrinsic energy storage. The solid oxide fuel cell includes a hydrogen electrode utilizing a modified anode active material. The modified anode active material allows for intrinsic energy storage within the hydrogen electrode which provides for transient response, load leveling applications, a decreased start-up time, and ability to accept charge. The solid oxide fuel cell may also include a modified cathode active material that allows for intrinsic energy storage within the oxygen electrode.

23 Claims, 5 Drawing Sheets

SOLID OXIDE FUEL CELL

FIELD OF THE INVENTION

The present invention generally relates to a solid oxide fuel cell. More particularly, the present invention relates to a solid oxide fuel cell using specialized anode active materials which allow for intrinsic energy storage.

BACKGROUND

A fuel cell is an energy-conversion device that directly converts the energy of a supplied gas into electric energy. Researchers have been actively studying fuel cells to utilize the fuel cell's potential high energy-generation efficiency. The base unit of the fuel cell is a cell having an oxygen electrode, a hydrogen electrode, and an appropriate electrolyte. Fuel cells have many potential applications such as supplying power for transportation vehicles, replacing steam turbines and power supply applications of all sorts. Despite their seeming simplicity, many problems have prevented the widespread usage of fuel cells.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, is supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

The major components of a typical solid oxide fuel cell are the hydrogen electrode for hydrogen oxidation and the oxygen electrode for oxygen reduction, both being positioned in contact with a solid impermeable electrolyte. The solid impermeable electrolyte may be a hard ceramic material which allows oxygen ions to flow therethrough. Typically, the reactants, such as hydrogen and oxygen, are fed through a porous hydrogen electrode and oxygen electrode and brought into surface contact and reacted with the electrolyte at the electrolyte interface of the electrodes. Oxygen ions are conducted through the solid impermeable electrolyte from the cathode to the anode where they are reacted with the fuel. The particular materials utilized for the hydrogen electrode and oxygen electrode are important since they must act as efficient catalysts for the reactions taking place.

In a solid oxide fuel cell, the reaction at the hydrogen electrode occurs between hydrogen fuel and oxygen ions ($O^=$), which react to form water and release electrons. The reactions at the hydrogen electrode of the solid oxide fuel cell are shown as:

$$H_2 + O^= \rightarrow H_2O(g) + 2e^-$$

$$CO + O^= \rightarrow CO_2 + 2e^-$$

At the oxygen electrode, oxygen and electrons react in the presence of the oxygen electrode catalyst to reduce the oxygen into oxygen ions ($O^=$). The reaction at the oxygen electrode of the solid oxide fuel cell is shown as:

$$O_2 + 4e^- \rightarrow 2O^=$$

The overall reaction for the solid oxide fuel cell is shown as:

$$H_2 + \tfrac{1}{2}O_2 \rightarrow H_2O(g)$$

The flow of electrons from the hydrogen electrode to the oxygen electrode is utilized to provide electrical energy for a load externally connected to the hydrogen and oxygen electrodes.

Solid oxide fuel cells require operation at high temperatures to maintain the ionic conductivity of the solid impermeable electrolyte. During operation, solid oxide fuel cells may reach temperatures up to approximately 1,800° F. or 1000° C. One of the main advantages of a solid oxide fuel cell is its ability to utilize hydrocarbon fuels as opposed to requiring a clean supply of hydrogen for operation. Because solid oxide fuel cells operate at high temperature there is the opportunity to reform hydrocarbons within the system either indirectly in a discrete reformer or directly on the anode of the cell. Reducing the operating temperature makes internal reforming more difficult and less efficient, and can mean that more active (and inevitably more expensive) reforming catalysts are required.

Solid oxide fuel cells have high fuel-to-electricity efficiencies, of about 60% normally or 85% with cogeneration. Furthermore, solid oxide fuel cells do not require any infrastructure development as they can be supplied with fuel from existing natural gas supply lines making their operation relatively inexpensive and immediate.

A main disadvantage of solid oxide fuel cells is that the fuel cell requires several hours to reach operating temperatures and begin producing power. This start-up issue is inherent in all high temperature fuel cells. Another issue in solid oxide fuel cells is the slow response to transients. Like other types of conventional fuel cells, the conventional solid oxide fuel cell does not have intrinsic capability to store energy. Intrinsic energy storage could allow for transient response, load leveling, and the ability to accept charge like a battery.

SUMMARY OF THE INVENTION

To provide for intrinsic energy storage in solid oxide fuel cells, the present invention provides for a hydrogen electrode having hydrogen storage capacity at temperatures greater than or equal to the operating temperature of the solid oxide fuel cell. The hydrogen electrode generally comprises an anode active material including a cermet material. The cermet material may include ceramic particles and a hydrogen storage material. The hydrogen storage material may be physically bonded to the ceramic particles of the cermet material. The cermet material may be intimately mixed with the hydrogen storage material and/or at least partially coated with the hydrogen storage material.

The hydrogen storage material may be selected from one or more hydrogen storage materials having a melting point above the operating temperature of the solid oxide fuel cell. The hydrogen storage materials are capable of absorbing and desorbing hydrogen at temperatures in the operating range of the solid oxide fuel cell. The hydrogen storage material may be selected from tantalum hydrogen storage materials, tungsten hydrogen storage materials, molybdenum hydrogen storage materials, niobium hydrogen storage materials, lanthanum series hydrogen storage materials, yttrium hydrogen storage materials, ytterbium hydrogen storage materials, titanium hydrogen storage materials, zirconium hydrogen storage materials, and combinations thereof. The hydrogen storage material may include one or more modifier elements selected from Co, Ni, Cr, V, Ti, Zr, Fe, C, B, and Si.

The solid oxide fuel cell may further comprise an oxygen electrode having oxygen storage capacity at temperatures greater than or equal to the operating temperatures of the solid oxide fuel cell. The oxygen electrode may provide oxygen storage capacity via one or more redox couples which store oxygen via a change in valency state through oxidation/reduction reactions. The one or more redox couples have a melting point greater than the operating temperature of the solid oxide fuel cell. The one or more redox couples may be selected from an iron/iron oxide redox couple, a nickel/nickel oxide redox couple, and a cobalt/cobalt oxide redox couple.

DETAILED DESCRIPTION OF THE PREFERRED EMBODIMENTS OF THE INVENTION

Described herein, is a solid oxide fuel cell with intrinsic energy storage capability. By allowing for intrinsic energy storage, the solid oxide fuel cell is able to provide for transient response, load leveling applications, a decreased start-up time, and ability to accept charge like a battery. The solid oxide fuel cell may allow for intermediate temperature operation whereby the temperature is less than 700° C. and high temperature operation whereby the operating temperature is greater than 700° C.

The solid oxide fuel cell generally comprises one or more cells connected in series. Each cell generates a limited voltage, however, the voltage of the fuel cell may be increased by connecting additional cells in series. The cells may have a flat or a cylindrical configuration. Each cell includes a hydrogen electrode, an oxygen electrode, and a solid impermeable electrolyte. The hydrogen electrode has a fuel interface, which contacts the incoming fuel, and an electrolyte interface which contacts the solid impermeable electrolyte. The oxygen electrode has an oxidant interface, which contacts the incoming oxidant and an electrolyte interface which contacts the solid impermeable electrolyte.

The hydrogen electrode for the solid oxide fuel cell is generally comprised of a cermet material. A cermet is a material comprising processed ceramic particles bonded with metallic particles. The ceramic particles used to form the cermet may be selected from materials such as tungsten carbide, titanium, zirconium boride, aluminum oxide, doped zirconia, and doped ceria. Dopants for zirconia can include scandium, yttrium, other rare earths and Group II elements such as Ca, Sr, Mg, Ba and oxides of all the above. Other ceramic materials may be used provided they can withstand the operating conditions within the solid oxide fuel cell. Metals bonded with the ceramic material to form the cermet may be selected from metals such as Fe, Co, Ni, Y, Ru, Cu, and Cr. The metals included in the cermet may be catalytic to the reformation reaction occurring at the fuel contacting surface of the hydrogen electrode. Stabilized zirconia may also be included within the cermet material to increase performance of the hydrogen electrode. The function of the zirconia phase is to support the metallic catalyst within the cermet, to inhibit coarsening of the metallic catalyst particles, and to provide an anode thermal expansion coefficient compatible with the other cell materials. The cermet preferably contains 20% to 40% interconnected porosity to facilitate the transport of the reactant and the product gases through the hydrogen electrode.

The cermet material further includes a hydrogen storage material which provides for storage of hydrogen in metal hydride form within the hydrogen electrode. By using a hydrogen storage material, the hydrogen electrode is able to store hydrogen thus allowing for intrinsic energy storage. The hydrogen storage material utilized in the hydrogen electrode, may also provide for a decreased start-up time for the fuel cell as the heat of hydride formation produced as a result of the absorption of hydrogen into the hydrogen storage material is able to assist in bringing the fuel cell up to operating temperatures. The cermet material may be at least partially coated with a hydrogen storage material, and/or the cermet material may be intimately mixed with the hydrogen storage material. The metallic particles bonded to the ceramic materials to form the cermet may be at least partially replaced with hydrogen storage material to form a modified cermet material. The modified cermet material may also be at least partially coated with a hydrogen storage material, and/or the cermet material may be intimately mixed with the hydrogen storage material. Where two or more hydrogen storage materials having differing hydrogen desorption temperatures are included in the electrode, the hydrogen storage materials may be layered throughout the electrode such that the hydrogen storage material having the lower hydrogen desorption temperature is closest to the solid impermeable electrolyte and the hydrogen storage material having the highest hydrogen desorption temperature is placed farthest from the solid impermeable electrolyte.

Figure 1:
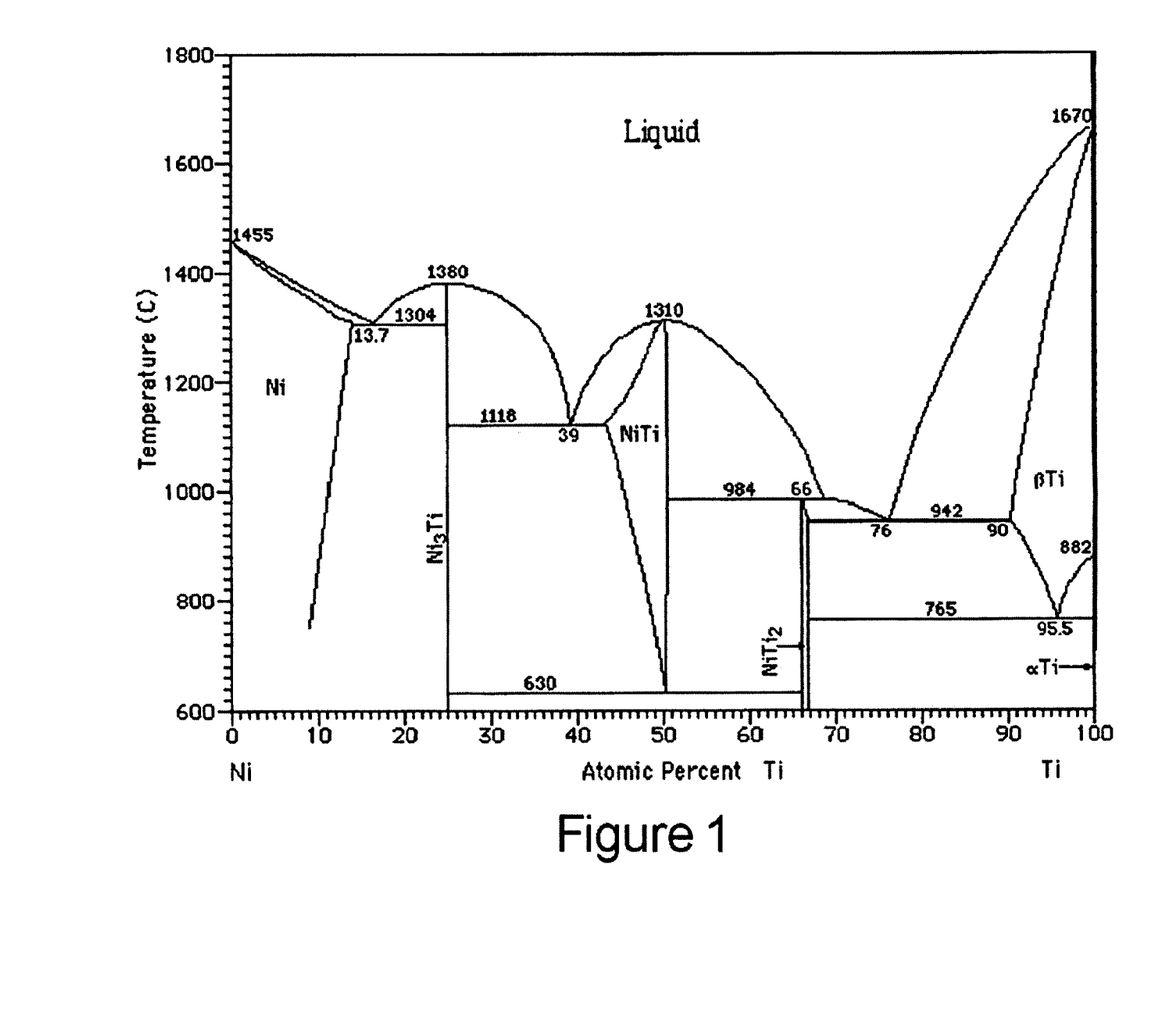
FIG. 1 shows a phase diagram for a binary Ni—Ti alloy.
Figure 2:
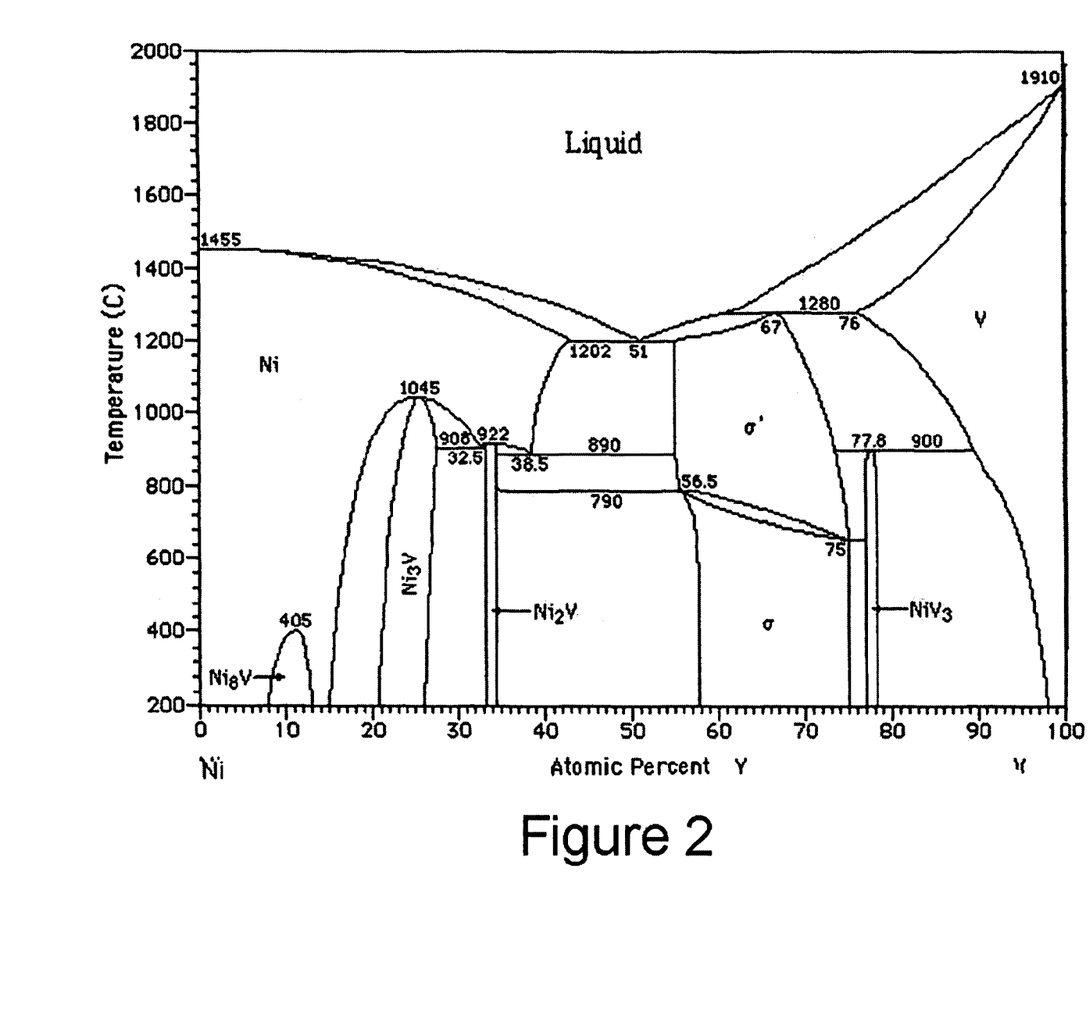
FIG. 2 shows a phase diagram for a binary Ni—V alloy.
Figure 3:
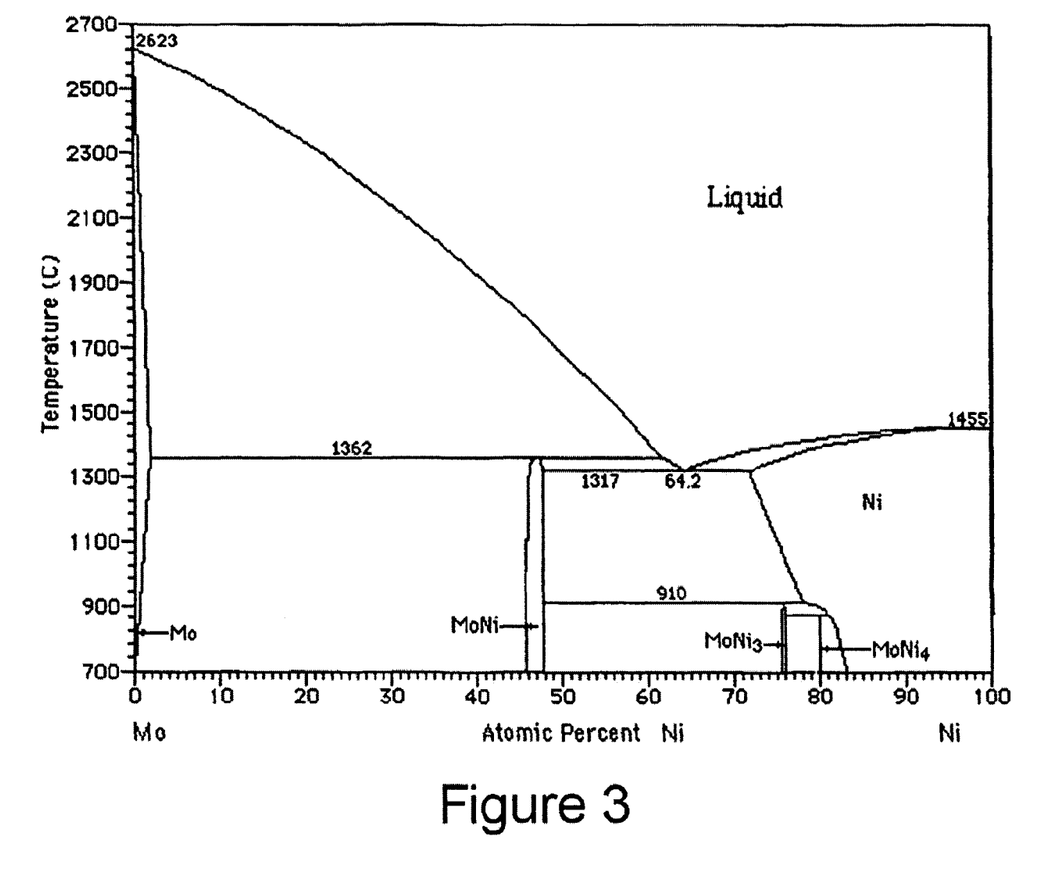
FIG. 3 shows a phase diagram for a binary Ni—Mo alloy.

The hydrogen storage material utilized in the hydrogen electrode is selected based on the desired operating condition of the solid oxide fuel cell. The hydrogen storage material may be selected from one or more hydrogen storage materials having a melting point above the operating temperature of the solid oxide fuel cell. These hydrogen storage materials are capable of absorbing and desorbing hydrogen at temperatures greater than or equal to the operating temperatures of the solid oxide fuel cell. As such, the hydrogen storage material should be at solid state at the operating temperatures of the fuel cell. Conventional hydrogen storage materials having melting points below the operating temperature of the solid oxide fuel cell are not suitable for providing intrinsic energy storage at temperatures greater than or equal to the operating temperature of the solid oxide fuel cell. Hydrogen storage materials may be selected from tantalum hydrogen storage materials, tungsten hydrogen storage materials, molybdenum hydrogen storage materials, niobium hydrogen storage materials, lanthanum series hydrogen storage materials, yttrium hydrogen storage materials, ytterbium hydrogen storage materials, titanium hydrogen storage materials, and zirconium hydrogen storage materials. Examples of binary high temperature transition metal hydrogen storage materials with hydrogen absorption/desorption properties are shown below in Table 1. Other examples of binary transition metal hydrogen storage materials that may be used in the hydrogen electrode are $Ni_{61}Ti_{39}$, $V_{51}Ni_{49}$, and $Ni_{64.2}Mo_{35.8}$. Shown in FIG. 1 is a phase diagram for a binary Ni—Ti alloy. Shown in FIG. 2 is a phase diagram for a binary Ni—V alloy. Shown in FIG. 3 is a phase diagram for a binary Ni—Mo alloy.

TABLE 1

| Composition | Hydrogen storage capacity wt % max | Heat of formation (kJ/mol) | Equilibrium Pressure (bar) | Desorption Temperature (° C.) | Desorption Temperature (° C.) at equilibrium pressure of 1 bar |
|---|---|---|---|---|---|
| $Zr_2Cu$ | 1.3 | 144 | 0.02 | 700 | 970 |
| $Zr_2Ni$ | 1.3 | 183 | 0.003 | 604 | 870 |

To tailor the performance of the hydrogen storage material for the specific operating conditions of the solid oxide fuel cell, one or more modifier elements selected from Ni, Co, Cr, Ti, Zr, V, W, Ta, Nb, Mo, Fe, C, B, and Si may be added to the hydrogen storage material. The base alloys may also include catalytic metallic particles surrounded by a supporting matrix that has been engineered to improve access of electrochemically and thermally reactive species to catalytic sites, thereby improving kinetics.

The oxygen electrode as used in the solid oxide fuel cell in accordance with the present invention may be any type oxygen electrode generally known to those skilled in the art for use in solid oxide fuel cells. Typical solid oxide fuel cell oxygen electrodes generally include a cathode active material. The cathode active material may include one or more metallic oxides. Examples of metallic oxides typically used in the cathode active material of solid oxide fuel cells are LSCF (a four component oxide based on La, Sr, Co, and Fe oxides), ceria doped LSCF, $LaSrMnO_3$, $LaCaMnO_3$, $LaMgMnO_3$, $LaSrCoO_3$, and $LaCaCoO_3$.

The oxygen electrode may include one or more redox couples. The one or more redox couples are able to store and provide oxygen at the operating temperatures of the solid oxide fuel cell. Oxygen is stored in the oxygen electrode within the reversible redox couples, and is then available as needed, at the electrolyte interface of the oxygen electrode. The one or more redox couples have a melting point greater than the operating temperature of the solid oxide fuel cell. The oxidation/reduction reactions of the redox couples occur both thermodynamically and kinetically at temperatures greater than the operating temperature of the solid oxide fuel cell. The redox couples provide the oxygen electrode with oxygen storage capacity while improving the efficiency of the fuel cell by matching the kinetics of the oxygen electrode to the kinetics of the hydrogen electrode. The oxygen stored in the redox couple may be utilized in the fuel cell during start-up or during operation when the flow of oxygen to the oxygen electrode is interrupted, or if the solid oxide fuel cell is used for transportation applications, regenerative braking energy could be recovered.

Numerous redox couples exist and may be used to form the cathode of this invention. When such couples are used, cycling transition from the oxidized form to the reduced form is accomplished repeatedly and continuously. From a practical point of view, the ability to withstand repeated cycling is preferred.

While not wishing to be bound by theory, the inventors believe that the equations representing some of the many available redox reactions for the oxygen side of the fuel cell are presented below. Using an iron/iron oxide couple, the following is believed to be the useful fuel cell oxygen reactions:

$4Fe+3O_2 \rightarrow 2Fe_2O_3$ (Chemical Oxidation)

$2Fe_2O_3+12e^- \rightarrow 4Fe+6O^=$ (Electrochemical reduction)

$O_2+4e^- \rightarrow 2O^=$ (Overall)

Using a nickel/nickel oxide couple, the following is believed to be the useful fuel cell oxygen reactions:

$2Ni+O_2 \rightarrow 2NiO$ (Chemical Oxidation)

$2NiO+4e^- \rightarrow 2O^{-2}+2Ni$ (Electrochemical Reduction)

$O_2+4e^- \rightarrow 2O^=$ (Overall)

Using a cobalt/cobalt oxide couple, the following is believed to be the useful fuel cell oxygen reactions:

$2Co+O_2 \rightarrow 2CoO$ (Chemical Oxidation)

$2CoO+4e^- \rightarrow 2O^=+2Co$ (Electrochemical Reduction)

$O_2+4e^- \rightarrow 2O^=$ (Overall)

Redox couples as used in fuel cell oxygen electrodes are described in detail in U.S. Pat. No. 6,620,539 to Ovshinsky et al., published Sep. 16, 2003, the disclosure of which is hereby incorporated by reference.

The hydrogen electrode and the oxygen electrode may be formed using a variety of thin film forming techniques such as sputtering, pasting, chemical vapor deposition, plasma vapor deposition, spraying, dipping, etc. The electrodes are typically about 10 to 1,000 microns or so in thickness. The hydrogen electrode and the oxygen electrode may be attached to or directly deposited on the solid impermeable electrolyte. The cermet material and/or the cathode active material may be supported on a conductive substrate. Preferably, the conductive substrate is flexible to accommodate the expansion/contraction of the electrolyte during operation of the solid oxide fuel cell. The conductive substrate may be any electrically conductive support structure selected from, but not limited to, an electrically conductive mesh, grid, foam, expanded metal, or combinations thereof. The conductive substrate may be formed of any electrically conductive material suitable for the operating conditions within the solid oxide fuel cell having a high resistance to oxidation. The conductive substrate may be formed of a metallic material having a melting temperature above 1000° C., preferably above 1100° C., most preferably above 1200° C.

The solid impermeable electrolyte may be comprised of any material known in the art to be used for the electrolyte in a solid oxide fuel cell. The material should provide for the transfer of oxygen ions through its structure while preventing the flow of other ions therethrough. The material should also be impermeable to the penetration of gas such that the fuel and the oxidant do not come into contact within the cell. The solid impermeable electrolyte may be selected from ceramic electrolytes such as ceria (cerium oxide), gadolinia doped ceria, zirconia (zirconium oxide), and zirconia doped with yttria. The solid impermeable electrolyte may have a thickness of 5 to 150 microns. The solid impermeable electrolyte may be deposited on the electrolyte interface of the hydrogen electrode or the oxygen electrode. The solid impermeable electrolyte may be formed by a variety of thin film forming techniques such as sputtering, pasting, chemical vapor deposition, plasma vapor deposition, spraying, dipping, etc. The solid impermeable electrolyte may be supported on a conductive substrate. Preferably, the conductive substrate is flexible to accommodate the expansion/contraction of the electrolyte during operation of the solid oxide fuel cell. The conductive substrate may be any electrically conductive support structure selected from, but not limited to, an electrically conductive mesh, grid, foam, expanded metal, or combinations thereof. The conductive substrate may be formed of any electrically conductive material suitable for the operating conditions within the solid oxide fuel cell and having a high resistance to oxidation. The conductive substrate may be formed of a metallic material having a melting temperature above 1000° C., preferably above 1100° C., most preferably above 1200° C.

Figure 4:
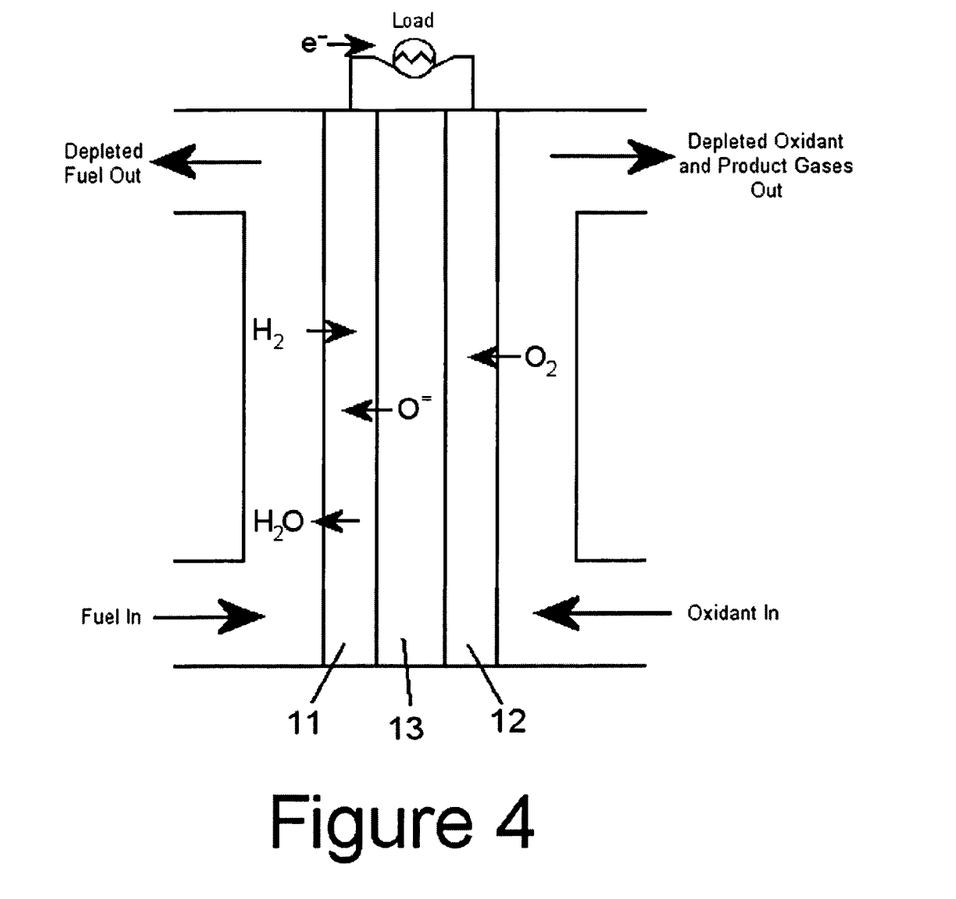
FIG. 4 shows a schematic of a solid oxide fuel cell in accordance with the present invention.

FIG. 4 shows a schematic of a solid oxide fuel cell in accordance with the present invention. The fuel supplied to the hydrogen electrode 11 may be a hydrocarbon based fuel or a hydrogen containing stream. When a hydrocarbon based fuel is utilized, the fuel is supplied to the cell and contacts the fuel interface of the hydrogen electrode and undergoes a reformation reaction producing hydrogen and carbon monoxide. The hydrogen produced by the reformation reaction passes through the hydrogen electrode and/or is absorbed by the hydrogen electrode, and reacts with oxygen ions in the electrolyte 13 at the electrolyte interface of the hydrogen electrode 11 to produce water and electrons. The carbon monoxide produced by the reformation reaction also passes through the hydrogen electrode 11 and is reacted with oxygen ions in the solid impermeable electrolyte 13 to produce carbon dioxide which exits the cell via a fuel waste stream with any unused fuel. Water produced by the reduction reaction at the electrolyte interface of the hydrogen electrode 11 may be utilized in the reformation reaction to produce hydrogen, and/or may exit the cell with carbon dioxide and any unused fuel in the fuel waste stream. When hydrogen is used as the fuel, no reformation of the fuel stream is needed. During operation, hydrogen enters the cell, passes through the hydrogen electrode 11 and/or is absorbed by the hydrogen electrode, and reacts with oxygen ions in the solid impermeable electrolyte 13 at the electrolyte interface of the hydrogen electrode to produce water and electrons. Water vapor formed as a product of the reaction at the electrolyte interface exits the cell through a waste stream which may contain any unreacted hydrogen. When the fuel cell is shut down, hydrogen absorbed by the hydrogen electrode and stored in hydride form remains stored in the electrode. The stored hydrogen may then be consumed by the solid oxide fuel cell upon startup to provide power prior to the fuel cell arriving at operating conditions necessary to reform the incoming fuel into hydrogen.

As fuel enters the cell and contacts the fuel interface of the hydrogen electrode, an oxygen containing stream is supplied to the cell and contacts the oxidant interface of the oxygen electrode 12. The oxygen containing stream passes through the oxygen electrode and contacts the solid impermeable electrolyte 13 at the electrolyte interface of the oxygen electrode. Oxygen from the oxygen containing stream is then reacted with electrons produced at the electrolyte interface of the hydrogen electrode to form oxygen ions. The oxygen ions then pass through the solid impermeable electrolyte 13 and are reacted with hydrogen ions at the electrolyte interface of the hydrogen electrode. Unused oxygen and any other gases contained in the oxygen containing stream exit the cell via an oxidant waste stream.

The hydrogen electrode 11 and the oxygen electrode 12 are in electrical communication with each other via an external circuit. As electrons are produced at the hydrogen electrode by the reaction of hydrogen with oxygen ions, the electrons travel via the external circuit to the oxygen electrode where the electrons react with oxygen molecules to form oxygen ions. The external circuit is in electrical communication with a load which utilizes the flow of electrons as a source of power.

Figure 5:
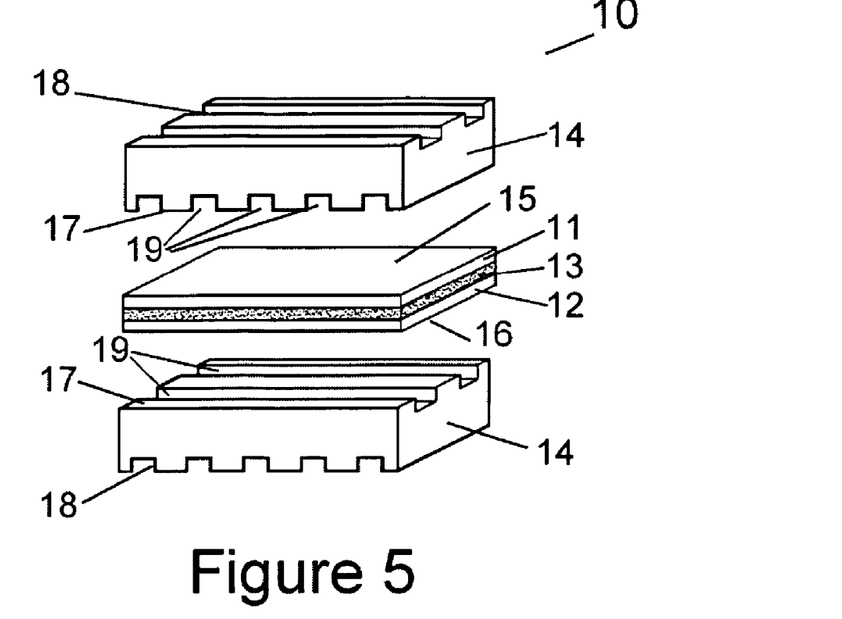
FIG. 5, is a depiction of a flat cell utilized in a solid oxide fuel cell.

A depiction of a flat cell is shown in FIG. 5. In the flat cell 10, the hydrogen electrode 11 and the oxygen electrode 12 are in contact with and separated by the solid impermeable electrolyte 13. The hydrogen electrode 11 and the oxygen electrode 12 may be attached to or deposited on the solid impermeable electrolyte 13. Each cell also includes interconnect plates 14 in contact with the hydrogen electrode 11 and the oxygen electrode 12 opposite the solid impermeable electrolyte 13. During operation of the flat cell 10, fuel and oxidant enter the cell and are distributed across the fuel interface 15 of the hydrogen electrode 11 and the oxidant interface 16 of the oxygen electrode 12 by the interconnect plates 14.

The interconnect plates 14 may be comprised of any conductive materials known by those skilled in the art for use in solid oxide fuel cells. The interconnect plates should be conductive, robust, and resistant to oxidation. Each interconnect plate has an inward surface 17 and an outward surface 18. The inward surface 17 of the interconnect plates contacts the fuel interface 15 of the hydrogen electrode 11 or the oxidant interface 16 of the oxygen electrode 12 and the outward surface 18 faces outward from the cell. The inward surface 17 of the interconnect plates 14 may have one or more flow channels 19 which provide for distribution of fuel or oxidant across the fuel interface of the hydrogen electrode or the oxidant interface of the oxygen electrode. The outward surface 18 of the interconnect plates may have a tongue in groove configuration which hold each cell in place as two or more cells are stacked together. The conductivity of the interconnect plates allows the cells to be connected in series when the cells are stacked in contact with one another.

Figure 6:
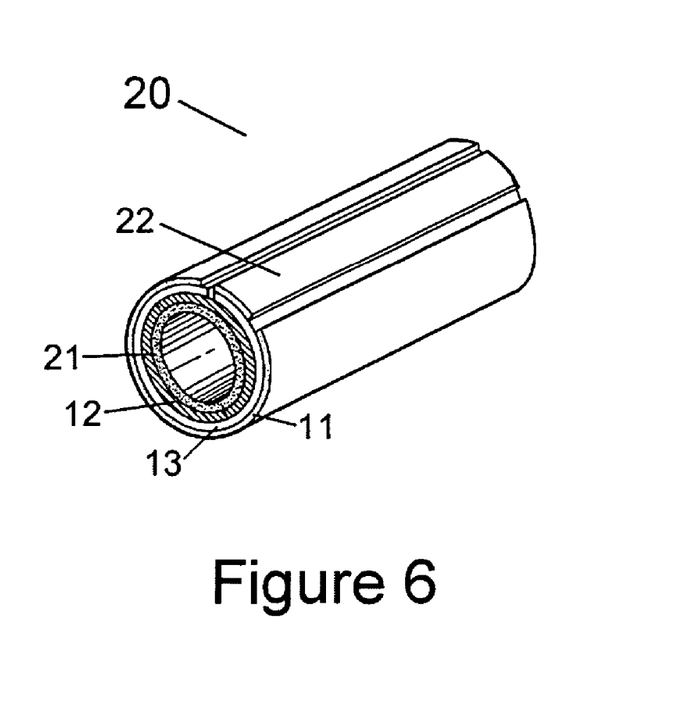
FIG. 6, is a depiction of a cylindrical cell utilized in a solid oxide fuel cell.

A depiction of a cylindrical cell 20 is shown in FIG. 6. Each cylindrical cell includes a hydrogen electrode 11, an oxygen electrode 12, a solid impermeable electrolyte 13, a porous ceramic cylindrical body 21, and a cylindrical interconnector 22. The hydrogen electrode 11 and the oxygen electrode 12 are in contact with and separated by the solid impermeable electrolyte 13. The hydrogen electrode 11 and the oxygen electrode 12 may be attached to or deposited on the solid impermeable electrolyte 13. The hydrogen electrode 11 has a fuel interface, which contacts the incoming fuel, and an electrolyte interface which contacts the solid impermeable electrolyte. The oxygen electrode has an oxidant interface, which contacts the incoming oxidant, which flows through the porous cylindrical body 21, and an electrolyte interface which contacts the solid impermeable electrolyte. The cylindrical cell 20 is constructed by coaxially and compactly wrapping, around the insulating porous ceramic cylindrical body 21, an oxygen electrode layer, a solid impermeable electrolyte layer, and a hydrogen electrode layer in that order from the inside. A cylindrical interconnector 22, serving as a terminal for the oxygen electrode, is in contact with the oxygen electrode but out of contact with the fuel electrode, and penetrates the electrolyte layer.

The cylindrical interconnector may be comprised of any conductive materials known by those skilled in the art for use in solid oxide fuel cells. The cylindrical interconnector should be conductive, robust, and resistant to oxidation. Each cylindrical interconnector is in contact with and serves as a terminal for oxygen electrode. The cylindrical interconnects allow more than one cell to be connected in series to increase the power output of the solid oxide fuel cell.

During operation of the cylindrical cell, fuel is introduced to the cell and contacts the fuel interface of the hydrogen electrode. As fuel is introduced to the cell, the oxidant enters through the center of the cell, flows through the porous ceramic cylindrical body, and contacts the oxidant interface of the oxygen electrode.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A solid oxide fuel cell comprising:
a hydrogen electrode including a cermet material, said hydrogen electrode having a hydrogen storage capacity at temperatures greater than or equal to the operating temperature of said solid oxide fuel cell.

2. The solid oxide fuel cell according to claim 1, wherein said cermet material comprises a plurality of ceramic particles physically bonded with a first hydrogen storage material having a melting point greater than the operating temperature of said solid oxide fuel cell.

3. The solid oxide fuel cell according to claim 2, wherein said first hydrogen storage material is selected from tantalum hydrogen storage materials, tungsten hydrogen storage materials, molybdenum hydrogen storage materials, niobium hydrogen storage materials, lanthanum series hydrogen storage materials, yttrium hydrogen storage materials, ytterbium hydrogen storage materials, titanium hydrogen storage materials, zirconium hydrogen storage materials, and combinations thereof.

4. The solid oxide fuel cell according to claim 2, wherein said first hydrogen storage material includes one or more modifier elements selected from Co, Ni, Cr, V, Ti, Zr, Fe, B, C, and Si.

5. The solid oxide fuel cell according to claim 2, wherein said cermet material is at least partially coated with and/or intimately mixed with a second hydrogen storage material having a melting point greater than the operating temperature of said solid oxide fuel cell.

6. The solid oxide fuel cell according to claim 5, wherein said second hydrogen storage material is selected from tantalum hydrogen storage materials, tungsten hydrogen storage materials, molybdenum hydrogen storage materials, niobium hydrogen storage materials, lanthanum series hydrogen storage materials, yttrium hydrogen storage materials, ytterbium hydrogen storage materials, titanium hydrogen storage materials, zirconium hydrogen storage materials, and combinations thereof.

7. The solid oxide fuel cell according to claim 6, wherein said second hydrogen storage material includes one or more modifier elements selected from Co, Ni, Cr, V, Ti, Zr, Fe, B, C, and Si.

8. The solid oxide fuel cell according to claim 1, wherein said anode active material comprises a cermet material at least partially coated with a hydrogen storage material and/or intimately mixed with a hydrogen storage material having a melting point greater than the operating temperature of said solid oxide fuel cell.

9. The solid oxide fuel cell according to claim 8, wherein said hydrogen storage material is selected from tantalum hydrogen storage materials, tungsten hydrogen storage materials, molybdenum hydrogen storage materials, niobium hydrogen storage materials, lanthanum series hydrogen storage materials, yttrium hydrogen storage materials, ytterbium hydrogen storage materials, titanium hydrogen storage materials, zirconium hydrogen storage materials, and combinations thereof.

10. The solid oxide fuel cell according to claim 9, wherein said hydrogen storage material includes one or more modifier elements selected from Co, Ni, Cr, V, Ti, Zr, B, C, and Si.

11. The solid oxide fuel cell according to claim 1 further comprising an oxygen electrode having oxygen storage capacity at temperatures greater than or equal to the operating temperature of said solid oxide fuel cell.

12. The solid oxide fuel cell according to claim 11, wherein said oxygen electrode includes one or more redox couples having a melting point greater than the operating temperature of said solid oxide fuel cell.

13. The solid oxide fuel cell according to claim 12, wherein said one or more redox couples are selected from an iron/iron oxide redox couple, a nickel/nickel oxide redox couple, and a cobalt/cobalt oxide redox couple.

14. A hydrogen electrode for a solid oxide fuel cell comprising:
an anode active material including a cermet material, said anode active material having hydrogen storage capacity at temperatures greater than or equal to the operating temperature of said solid oxide fuel cell.

15. The hydrogen electrode according to claim 14, wherein said anode active material comprises a cermet material including ceramic particles physically bonded with a first hydrogen storage material having a melting point greater than the operating temperature of said solid oxide fuel cell.

16. The hydrogen electrode according to claim 15, wherein said first hydrogen storage material is selected from tantalum hydrogen storage materials, tungsten hydrogen storage materials, molybdenum hydrogen storage materials, niobium hydrogen storage materials, lanthanum series hydrogen storage materials, yttrium hydrogen storage materials, ytterbium hydrogen storage materials, titanium hydrogen storage materials, zirconium hydrogen storage materials, and combinations thereof.

17. The hydrogen electrode according to claim 15, wherein said first hydrogen storage material includes one or more modifier elements selected from Co, Ni, Cr, V, Ti, Zr, B, C, and Si.

18. The hydrogen electrode according to claim 15, wherein said cermet material is at least partially coated with a second hydrogen storage material and/or intimately mixed with said second hydrogen storage material having a melting point greater than the operating temperature of said solid oxide fuel cell.

19. The hydrogen electrode according to claim 18, wherein said second hydrogen storage material is selected from tantalum hydrogen storage materials, tungsten hydrogen storage materials, molybdenum hydrogen storage materials, niobium hydrogen storage materials, lanthanum series hydrogen storage materials, yttrium hydrogen storage materials, ytterbium hydrogen storage materials, titanium hydrogen storage materials, zirconium hydrogen storage materials, and combinations thereof.

20. The hydrogen electrode according to claim 19, wherein said second hydrogen storage material includes one or more modifier elements selected from Co, Ni, Cr, V, Ti, Zr, B, C, and Si.

21. The hydrogen electrode according to claim 14, wherein said anode active material comprises a cermet material at least partially coated with a hydrogen storage material and/or intimately mixed with a hydrogen storage material having a melting point greater than the operating temperature of said solid oxide fuel cell.

22. The hydrogen electrode according to claim 21, wherein said hydrogen storage material is selected from tantalum hydrogen storage materials, tungsten hydrogen storage materials, molybdenum hydrogen storage materials, niobium hydrogen storage materials, lanthanum series hydrogen storage materials, yttrium hydrogen storage materials, ytterbium hydrogen storage materials, titanium hydrogen storage materials, zirconium hydrogen storage materials, and combinations thereof.

23. The hydrogen electrode according to claim 21, wherein said hydrogen storage material includes one or more modifier elements selected from Co, Ni, Cr, V, Ti, Zr, B, C, and Si.

* * * * *